US007929621B2

(12) United States Patent
Kim et al.

(10) Patent No.: US 7,929,621 B2
(45) Date of Patent: Apr. 19, 2011

(54) TERMINAL DEMODULATION APPARATUS AND METHOD

(75) Inventors: Jun-Woo Kim, Daejeon (KR); Jae-Gun Jung, Daejeon (KR); Dae-Ho Kim, Daejeon (KR); Hyeong-Sook Park, Daejeon (KR); Youn-Ok Park, Daejeon (KR)

(73) Assignees: Samsung Electronics Co., Ltd. (KR); Electronics and Telecommunications Research Institute (KR); KT Corporation (KR); SK Telecom Co., Ltd. (KR); Hanaro Telecom, Inc. (KR)

( * ) Notice: Subject to any disclaimer, the term of this patent is extended or adjusted under 35 U.S.C. 154(b) by 829 days.

(21) Appl. No.: 11/636,815

(22) Filed: Dec. 11, 2006

(65) Prior Publication Data
US 2007/0133703 A1 Jun. 14, 2007

(30) Foreign Application Priority Data
Dec. 9, 2005 (KR) .................. 10-2005-0120813

(51) Int. Cl.
*H04K 1/10* (2006.01)
*H04L 27/28* (2006.01)

(52) U.S. Cl. ...................................... 375/260

(58) Field of Classification Search .............. 375/259, 375/260, 347, 355; 370/208, 210, 281, 344
See application file for complete search history.

(56) References Cited

U.S. PATENT DOCUMENTS
6,842,421 B1 * 1/2005 Sarraf et al. .................. 370/208
6,912,682 B1 * 6/2005 Aoki ............................ 714/764

FOREIGN PATENT DOCUMENTS
KR     1020050051746     6/2005

OTHER PUBLICATIONS
Saverio Cacopardi et al., High End Implementation of DVB-T OFDM Demodulator Using General Purpose DSPs, 1998 IEEE, pp. 382-383.

* cited by examiner

*Primary Examiner* — David C Payne
*Assistant Examiner* — Syed Haider
(74) *Attorney, Agent, or Firm* — The Farrell Law Firm, LLP

(57) ABSTRACT

A terminal demodulation apparatus previously stores a received frame signal in a memory before inputting the same into a fast Fourier transform (FFT) unit, performs a demodulation to necessary information read from the corresponding memory, and has a separate data subcarrier memory and pilot subcarrier memory, and uses the signal demodulation method mixed with a subcarrier allocation method so as to easily demodulate various subcarrier allocation methods.

14 Claims, 5 Drawing Sheets

TERMINAL DEMODULATION APPARATUS AND METHOD

PRIORITY

This application claims priority to and the benefit of Korean Patent Application No. 10-2005-0120813 filed in the Korean Intellectual Property Office on Dec. 9, 2005, the entire contents of which are incorporated herein by reference.

BACKGROUND OF THE INVENTION

1. Field of the Invention

The present invention relates to a terminal demodulation apparatus and method of a communication system. More particularly, the present invention relates in a terminal demodulation apparatus and method in an Orthogonal Frequency Division Multiplexing System.

2. Description of the Related Art

Generally, an Orthogonal Frequency Division Multiplexing (OFDM) scheme used in wireless communication systems is a modulation scheme having a plurality of carriers. The OFDM systems are well known to have a superior modulation/demodulation performance under a mobile receive environment that is subject to multi-path interferences and fading effect.

FIG. 1 illustrates a downlink frame of an OFDM signal.

A preamble symbol 100 of the frame is used to acquire a synchronization of time, acquire a synchronization of frequency, search a cell in which a terminal is included, and estimate a channel.

Mobile Allocation Part (MAP) information 110 of the frame includes demodulation-related information and information related to the state of a base station. Particularly, the MAP information 110 includes location information of a user data burst, size information of the user data burst, information related to modulation scheme, and information related to subcarrier allocation method.

Accordingly, when the terminal does not correctly demodulate the MAP information 110, the terminal cannot receive other information included in the frame. The MAP information 110 often has a variable length according to the number of the terminals provided service by the present base station.

Various types of user data 120, 130, and 140 are allocated. The user data 120, 130, and 140 are allocated in various subcarrier allocation schemes and modulation schemes according to the channel state of to the respective terminals. For example, when the terminal has a good channel environment and requires data of a large capacity, the base station modulates the data in 64 QAM (Quardrature Amplitude Modulation) and allocates data in 5/6 channel coding. However, when the terminal has a bad channel environment, the base station allocates the data in QPSK (Quadrature Phase Shift Keying) modulation and in 1/12 channel coding, and if not satisfied, may allocate data in a subcarrier allocation scheme having a lot of pilot carriers in a symbol.

For example, in FIG. 1, the user data 120 is modulated in the subcarrier allocation Type 1 and in 16 QAM, the user data 130 is modulated in the subcarrier allocation Type 2 and in QPSK, and the user data 140 may be modulated in the subcarrier allocation scheme Type 2 and in 64 QAM.

FIG. 2 illustrates various subcarrier allocation schemes capable of being selected according to a channel environment of between the base station and terminal.

The subcarrier allocation scheme Type 1 may be used for the terminal having a good channel state, in which the number of the pilot subcarriers is given as 1 for 8 data subcarriers. The subcarrier allocation scheme Type 2 may be used for the terminal having a bad channel state, in which a ratio of the pilot subcarriers with respect to the data subcarrier is given as 1:2. The more pilot subcarriers are given, the more accurately the channel state is estimated. Accordingly, the information damaged in the bad channel may be correctly recovered.

Although it is efficient to use various modulation schemes and subcarrier allocation schemes according to the terminal-channel state, the structure is difficult and power consumption is increased because the terminal must support all of the types of modulation schemes and subcarrier allocation schemes.

FIG. 3 is a block diagram of a conventional OFDM demodulation apparatus.

The conventional OFDM demodulation apparatus includes an analog-digital converter (ADC) 300, a fast Fourier transform (FFT) unit 310, a rear-FFT memory 320, a scramble code generator unit 330, a channel estimator 340, an equalizer 350, a QAM demapper 360, and a channel decoder 370.

The ADC 300 receives input analog signals, transforms the received analog signals into digital signals, and outputs the transformed signals.

The FFT unit 310 performs a FFT on the digital signals received from the analog-digital converter 300, that is, the data subcarriers and pilot subcarriers and transforms the digital signals into data symbols of the frequency domain.

The rear-FFT memory 320 stores data output from the FFT unit 310, and reads the data. The scramble code generator unit 330 generates pseudo-noise scramble codes and output the generated codes.

The scramble code generator 330 includes a scramble code generator 332 for generating and outputting scramble codes and a scramble code memory 334 for storing the scramble codes output from the scramble code generator 332.

The scramble code generator unit 330 is preloaded with many scramble codes, and outputs the corresponding scramble code according to a subcarrier allocation algorithm.

The multiplying unit 380 performs a descrambling function by multiplying the extracted subcarriers of the memory 320 and the scramble code so as to decrease an inter-cell interference.

The channel estimator 340 detects a pilot subcarrier from among the subcarriers read from the memory 320, compares the detected pilot subcarrier to the reference pilot signal, estimates a channel according to changed phases, and transmits the channel estimate to the equalizer 350.

The equalizer 350 detects a data subcarrier among the subcarriers read from the memory 320, equalizes the detected data subcarrier using the channel estimate received from the channel estimator 340, and accordingly, eliminates channel interference.

The QAM demapper 360 demodulates an output value of the equalizer and transmits the demodulated data to the channel decoder 370. The channel decoder 370 decodes the transmitted data.

Such a demodulation method is not appropriate for a frame having various modulation methods and subcarrier allocation methods.

Generally, since a bit size of the received signal of the terminal is determined according to a bit size of the ADC 300, data size output from the analog-digital converter 300, that is, the bit size of the received signal of the terminal, is relatively small.

However, the bit size of the received signal of the terminal increases when it passes the FFT unit 310.

Accordingly, the rear-FFT memory 320 provided after the FFT unit 310 needs more memory capacity than a memory (not shown) provided in the front of the FFT unit 310.

The subcarrier allocation scheme or modulation scheme-related information will be known when the demodulation of the map information of in the front of the frame and the decoding of the channel decoder 370 is finished. Accordingly, the rear-FFT memory 320 stores a great amount of symbol data, and accordingly, the rear-FFT memory 320 has a large load.

The conventional demodulation apparatus will have a decreased hardware load by descrambling in which the subcarrier and scramble code extracted from the rear-FFT memory 320 are sequentially multiplied. This is because the output of the FFT unit 310 may be sequentially transmitted through a re-ordering and may be directly multiplied by the scramble code generated by the scramble code generator 330.

However, in some systems such as the portable Internet system, the scramble code may randomly change in the middle of a frame, information about whether a new code starts from any a symbol are described in the MAP information 110.

For example, in FIG. 1, the user data 102 may use a scramble code Type 1, and the user data 103 and the user data 104 may use a scramble code Type 2.

Accordingly, the conventional demodulation apparatus shown in FIG. 3 must store the output values of the FFT unit 310 in the not-descrambled state until the map decoding is finished, and then multiply the scramble code when the subcarrier values are read from the rear-FFT memory 320.

In addition, a process for reading the subcarrier from the rear-FFT memory 320 is non-sequentially performed according to a complex subcarrier allocation algorithm. Accordingly, the hardware load becomes increased because the scramble code generator 330 previously generates a few hundred or a few thousand scramble code samples, stores the generated samples, reads the same according to the subcarrier allocation algorithm, and multiplies the same by the scramble codes.

The rear-FFT memory 320 of the conventional demodulation apparatus shown in FIG. 3 simultaneously stores a pilot subcarrier and a data subcarrier.

The channel estimator 340 reads a pilot subcarrier and the equalizer 350 reads a data subcarrier. Operation for reading the rear-FFT memory 320 must be time-shared so as to simultaneously read the two types of information. That is, the demodulation apparatus must read the rear-FFT memory 320 using a clock running two or more times faster than a system clock, and accordingly, the demodulation apparatus has an increased load.

One attempt to solve such a problem, considered that the pilot subcarrier and the data subcarrier are respectively stored at the separate memories. However, such a method is impossible because the subcarrier allocation method of the received symbol is not known before the map decoding is finished.

SUMMARY OF THE INVENTION

The present invention has been made in an effort to provide a terminal demodulation apparatus and method in a communication system having advantages of previously storing a frame receive signal at a memory before inputting the same into a FFT unit and demodulating information read from the corresponding memory.

The present invention has been made in an effort to provide a terminal demodulation apparatus and method in a communication system having advantages of storing a pilot subcarrier and a data subcarrier in separate memories.

A preferred embodiment of the present invention provides an apparatus for demodulating a receive signal in a terminal of a communication system. The terminal demodulation apparatus includes a front memory for receiving and storing a frame signal including a pilot subcarrier and a data subcarrier; a fast Fourier transform (FFT) unit for performing FFT on the frame signal to output data symbols; a scramble code generator for generating and outputting a scramble code; a rear memory for receiving and storing descrambled subcarriers, the descrambled subcarriers being formed by multiplying the data symbols by the scramble code; and a demodulator for demodulating the descrambled subcarriers.

Another preferred embodiment of the present invention provides a method of demodulating a receive signal in a terminal of a communication system. The terminal demodulation method includes receiving a frame signal including a pilot subcarrier and a data subcarrier and storing the frame signal at a front memory; demodulating MAP information extracted from the frame signal of the front memory; determining if the frame signal has data allocated to the corresponding terminal using the MAP information; storing the pilot subcarrier and the data subcarrier when the frame receive signal has the allocated data; and demodulating the frame signal by using the pilot subcarrier and data subcarrier.

Yet another preferred embodiment of the present invention provides a terminal including a first memory for storing a frame signal including a pilot subcarrier and a data subcarrier; means for extracting MAP information from the first memory and determining if the frame signal has data allocated to the terminal by using the MAP information; and means for performing demodulation using the pilot subcarrier and the data subcarrier when the frame signal has the allocated data.

BRIEF DESCRIPTION OF THE DRAWINGS

The above and other objects, features and advantages of the present invention will become more apparent from the following detailed description, take in conjunction with the accompanying drawings, in which.

DETAILED DESCRIPTION OF THE PREFERRED EMBODIMENTS

Figure 1:
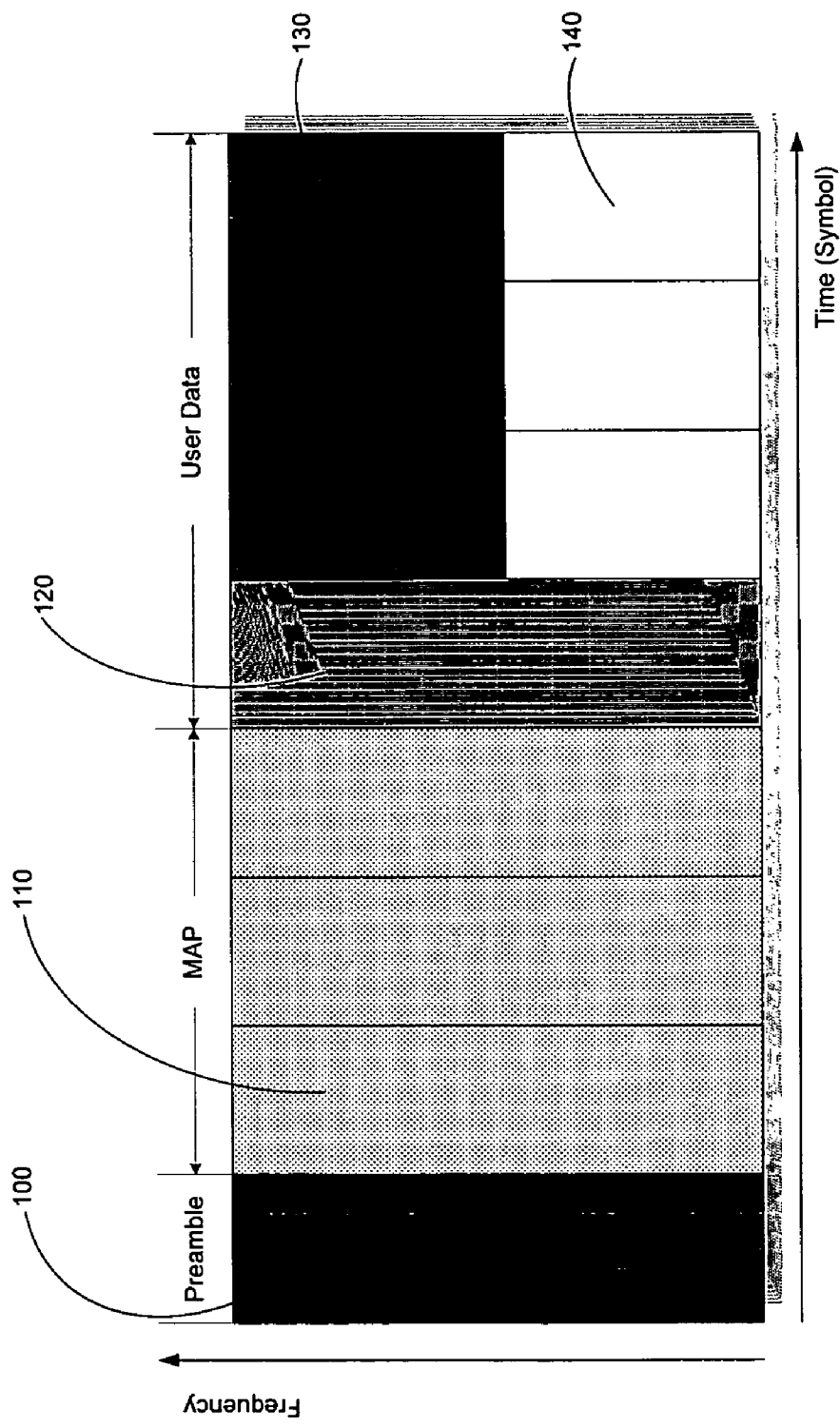
FIG. 1 illustrates a downlink frame of OFDM signal.
Figure 2:
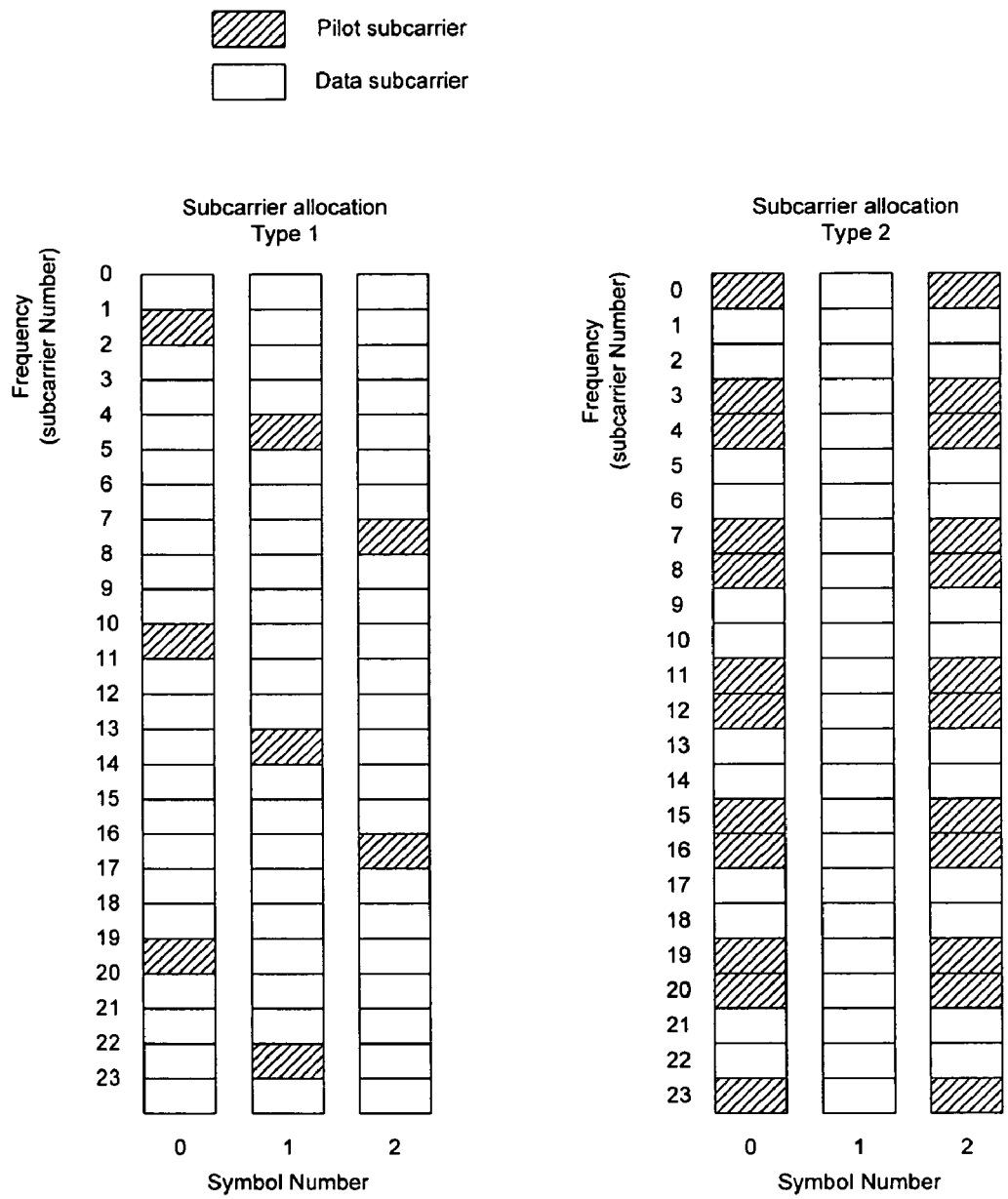
FIG. 2 illustrates various subcarrier allocation methods capable of being selected according to a channel environment between the base station and the terminal.
Figure 3:
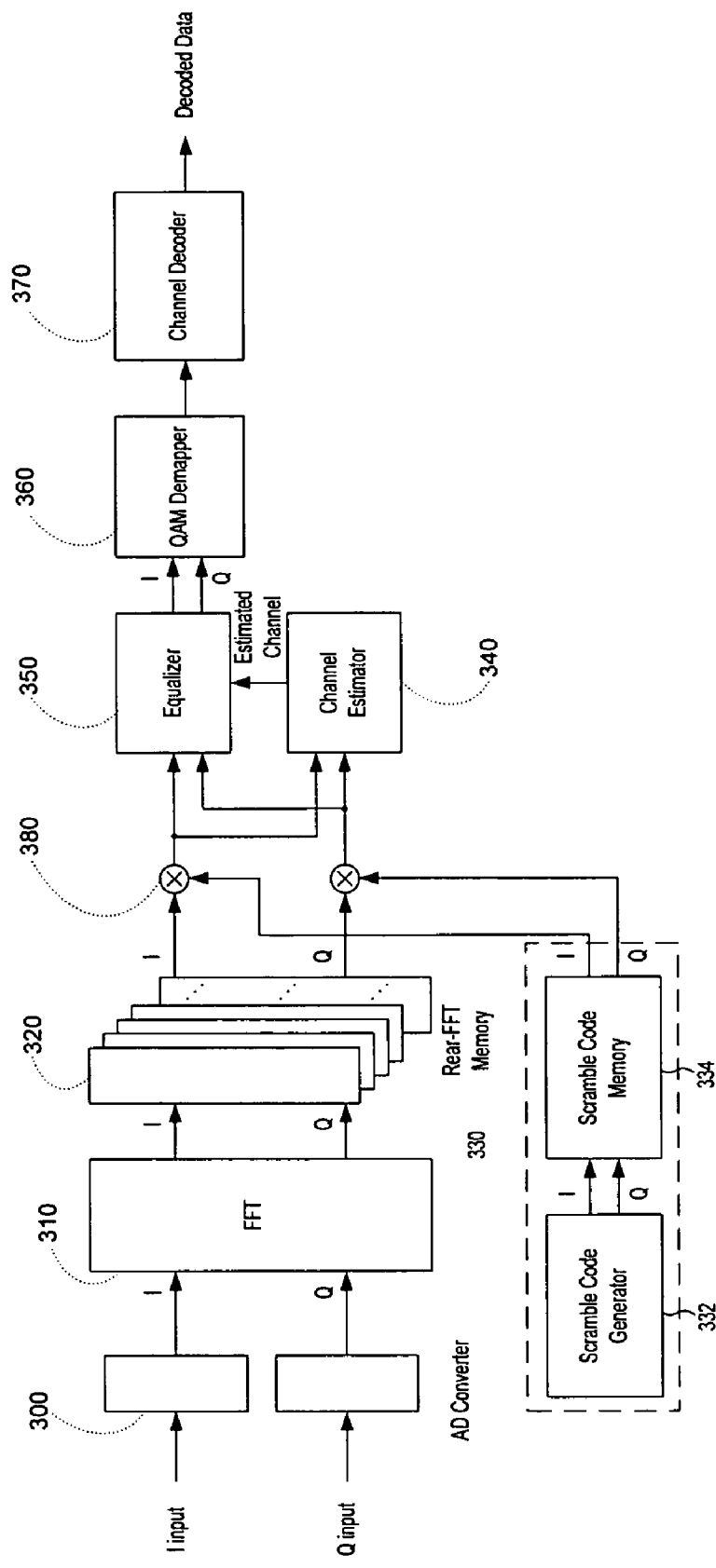
FIG. 3 is a block diagram showing internal elements of the conventional OFDM demodulation apparatus.

In the following detailed description, only certain preferred embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

A terminal demodulation apparatus of a communication system according to an exemplary embodiment of the present invention is described in detail with reference to drawings. According to the exemplary embodiment of the present invention, the communication system is described, for example, as an Orthogonal Frequency Division Multiplexing (OFDM)-based communication system, but may be applied to different communication systems.

Figure 4:
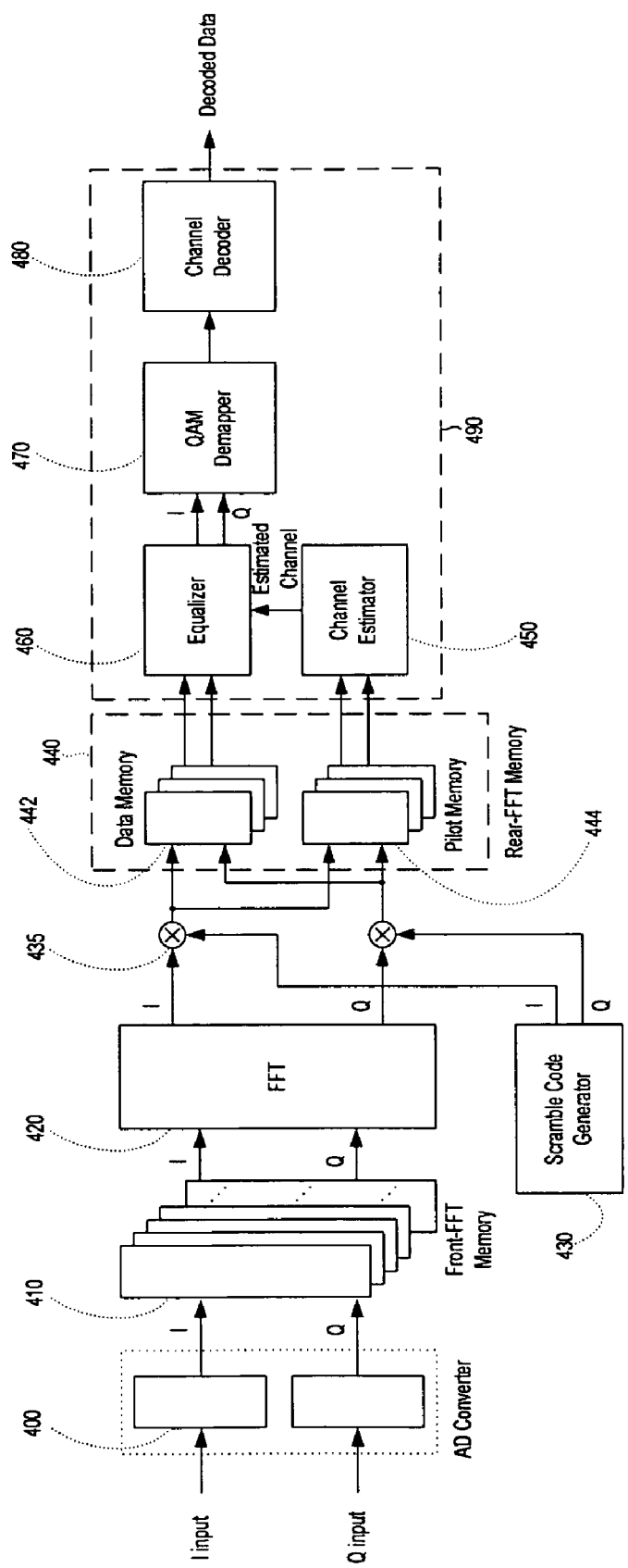
FIG. 4 is a block diagram a terminal demodulation apparatus of a communication system according to the exemplary embodiment of the present invention.

FIG. 4 is a block diagram a terminal demodulation apparatus of a communication system according to the exemplary embodiment of the present invention.

The terminal demodulation apparatus includes an analog-digital converter (ADC) 400, a front-FFT memory 410, a fast Fourier transform (FFT) unit 420, a scramble code generator 430, descrambler 435, a rear-FFT memory 440, and a demodulator 490.

The ADC 400 converts a frame signal into a digital signal, and outputs the converted frame signal.

The front-FFT memory 410 temporally stores the frame signal output from the ADC 400.

When the front-FFT memory 410 stores the frame signal, only the MAP information (e.g., 110 of FIG. 1) from among the received data can be previously demodulated. Accordingly, the terminal demodulation apparatus can determine whether the present frame has the data allocated to the corresponding terminal. When the front-FFT memory 410 determines that the present frame has no data allocated to the corresponding terminal, the terminal demodulation apparatus stops the demodulation to the remaining part of the frame signal and the storing of the remaining part in the front-FFT memory 410, thereby reducing power consumption of the terminal. In one embodiment, the demodulator 490 may perform the demodulation of the MAP information.

In addition, the front-FFT memory 410 may previously demodulate the MAP information and determine which modulation method and subcarrier allocation method are used in the data requested by the terminal, or which symbols have the data among the frame signal.

The FFT unit 420 performs a FFT on the frame signal received from the ADC 400, i.e., the frame signal including data subcarrier and pilot subcarrier, to convert the frame signal into data symbols of a frequency domain.

The scramble code generator 430 generates a scramble code, that is, a pseudo-noise, and outputs the generated scramble code.

The descrambler 435 performs descrambling by multiplying the subcarriers extracted from the FFT unit 420 by the scramble code so as to reduce inter-cell interference.

As such, the terminal demodulation apparatus may reduce a hardware load by multiplying the output value sequentially output and re-ordered by the FFT unit 420 by the scramble code generated from the scramble code generator 430.

The rear-FFT memory 440 stores a data subcarrier among the descrambled subcarriers at a data subcarrier memory 442 and a pilot subcarrier among the descrambled subcarriers at a pilot subcarrier memory 444.

That is, since the front-FFT memory 410 previously demodulates the MAP information, the terminal demodulation apparatus knows which symbols have the data among the frame and which modulation method and subcarrier allocation method are used in the data symbols. Accordingly, the pilot subcarrier and data subcarrier can be stored at separated storage spaces, i.e., the data subcarrier memory 442 and the pilot subcarrier memory 444.

The demodulator 490 includes a channel estimator 450, an equalizer 460, a QAM demapper 470, and a channel decoder 480.

The channel estimator 450 receives the pilot subcarrier from the pilot subcarrier memory 444, compares the pilot subcarrier to a reference pilot signal to estimate a channel according to the changed phase of the pilot subcarrier, and transmits the channel estimate to the equalizer 460.

The equalizer 460 receives the data subcarrier from the data subcarrier memory 442, and equalizes the data subcarrier by using the channel estimate of the channel estimator 450 to remove channel influence.

Since the channel estimator 450 reads only the pilot subcarrier memory 444 and the equalizer 460 reads only the data subcarrier memory 442, the estimator 450 and the equalizer 460 can simultaneously read the pilot and data subcarrier without time-division.

Since a generally used dual-port memory may simultaneously read two values, the channel estimator 450 can read two pilot subcarriers in one symbol without time-division.

The QAM demapper 470 demodulates the equalizer output values, and transmits the demodulated data to the channel decoder 480. The channel decoder 480 decodes the demodulated data.

Figure 5:
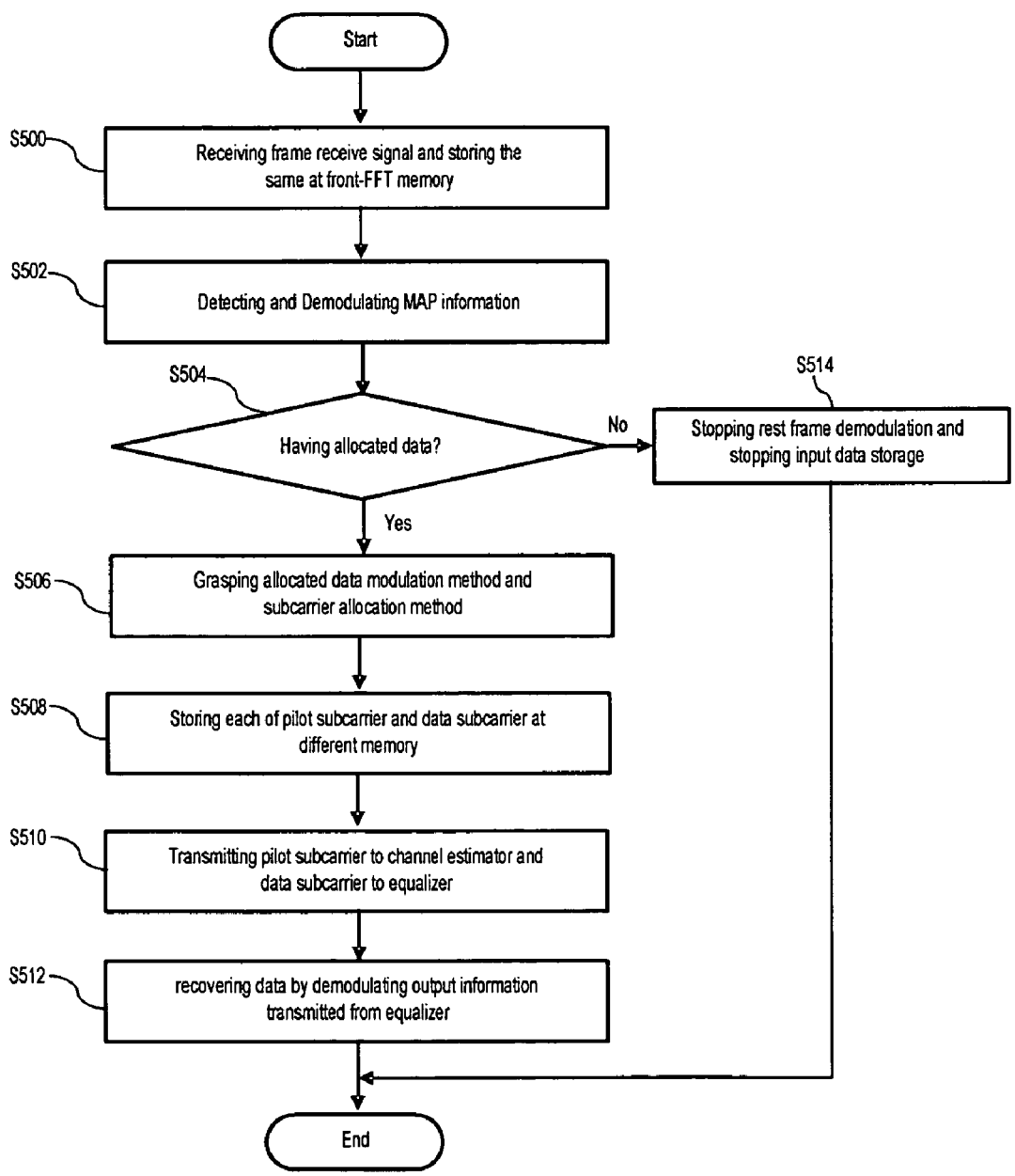
FIG. 5 is a flowchart showing demodulation method of a frame signal in a terminal demodulation apparatus according to the exemplary embodiment of the present invention.

Demodulation method of a frame signal in a terminal demodulation apparatus according to the exemplary embodiment of the present invention will be described in detail with reference to FIG. 5.

The terminal demodulation apparatus receives the frame signal including a pilot subcarrier and a data subcarrier and stores the frame signal in the front-FFT memory (410 of FIG. 4) at step S500.

A controller (not shown) of the terminal demodulation apparatus extracts only the MAP information (e.g., 110 of FIG. 1) from among the frame signal stored at the front memory 410 and demodulates the MAP information at step 502. The controller determines if the present frame has data allocated to the corresponding terminal at step S504.

When the controller determines that the present frame has data allocated to the corresponding terminal, the controller determine which symbols have the data among the frame signals and which modulation method and subcarrier allocation method are used in the data symbols at step S506.

Since the front-FFT memory 410 previously demodulates the MAP information, the terminal demodulation apparatus can know which symbols have the data among the frame signals, and which modulation method and subcarrier allocation method are used in the data symbols. Accordingly, the pilot subcarrier and data subcarrier can be stored at separated storage spaces.

The controller stores a data subcarrier among the descrambled subcarriers at the data subcarrier memory (442 of FIG. 4) and a pilot subcarrier among the descrambled subcarriers at the pilot subcarrier memory (444 of FIG. 4) at step S508.

The channel estimator 450 receives the pilot subcarrier from the pilot subcarrier memory 444, and compares the pilot subcarrier to a reference pilot signal to estimate a channel according to the changed phase of the pilot subcarrier at step S510. The channel estimator 450 transmits the channel estimate to the equalizer (460 of FIG. 4).

The equalizer 460 receives the data subcarrier from the data subcarrier memory 442 and equalizes the data subcarrier by using the channel estimate, and accordingly, removes channel influence.

The terminal demodulation apparatus decodes a data the data from the equalizer (460 of FIG. 4) by using the QAM demapper (470 of FIG. 4) and channel decoder (480 of FIG. 4) at step S512.

When the front memory 410 determines that the present frame has no data allocated to the corresponding terminal at the step S504, the terminal demodulation apparatus stops the demodulation for remaining part of the frame signal and the storing of the remaining part at step S514, thereby reducing terminal power consumption.

According to the exemplary embodiment of the present invention, since the memory for previously storing the frame signal before the frame signal is input to the FFT unit is provided, only necessary information is demodulated, thereby reducing demodulation power consumption.

In addition, the MAP information is previously demodulated so that the pilot subcarrier and data subcarrier are stored at the separated memories, and thus, the memories may be read without time-division.

In addition, the information sequentially output from the FFT unit may be sequentially descrambled according to the generated scramble code, thereby largely reducing a hardware load.

While this invention has been described in connection with what is presently considered to be practical embodiments, it is to be understood that the invention is not limited to the disclosed embodiments, but, is intended to cover various modifications and equivalent arrangements included within the spirit and scope of the appended claims.

What is claimed is:

1. An apparatus for demodulating a receive signal in a terminal of a communication system, comprising:
a front memory for receiving and storing a frame signal including a pilot subcarrier and a data subcarrier;
a fast Fourier transform (FFT) unit for performing FFT on the frame signal to output data symbols;
a scramble code generator for generating and outputting a scramble code;
a rear memory for receiving and storing descrambled subcarriers, the descrambled subcarriers being formed by multiplying the data symbols by the scramble code; and
a demodulator for demodulating the descrambled subcarriers,
wherein the demodulator previously demodulates Mobile Allocation Part (MAP) information extracted from the frame signal stored in the front memory before demodulating the descrambled subcarriers.

2. The apparatus of claim 1, wherein the rear memory includes a data subcarrier memory for storing a descramble data subcarrier corresponding to the data subcarrier, and a pilot subcarrier memory for storing a descrambled pilot subcarrier corresponding to the pilot subcarrier.

3. The apparatus of claim 1, wherein the demodulator calculates a channel estimate by channel-estimating the descrambled pilot subcarrier and performs channel equalization and decoding process using the channel estimate and the descrambled data subcarrier.

4. The terminal apparatus of claim 1, further comprising a descrambler for generating the descrambled subcarriers by multiplying the output values output from the FFT unit by the scramble code.

5. The apparatus of claim 1, wherein the communication system is an Orthogonal Frequency Division Multiplexing (OFDM) based communication system.

6. A method of demodulating a receive signal in a terminal of a communication system, the method comprising:
storing a frame signal including a pilot subcarrier and a data subcarrier and storing the frame signal in a front memory;
demodulating Mobile Allocation Part (MAP) information extracted from the frame signal of the front memory;
determining whether the frame signal has data allocated to the corresponding terminal using the MAP information;
storing the pilot subcarrier and the data subcarrier when the frame signal has the allocated data; and
demodulating the frame signal by using the pilot subcarrier and data subcarrier
wherein the MAP information is previously demodulated before the frame signal is demodulated.

7. The method of claim 6, wherein the pilot subcarrier is stored at a first rear memory, and the data subcarrier is stored at a second rear memory separated from the first rear memory.

8. The method of claim 6, further comprising determining a modulation method for the allocated data and a subcarrier allocation method by using the MAP information.

9. The method of claim 6, wherein the performing the demodulation includes calculating a channel estimate by channel-estimating the stored pilot subcarrier;
performing channel equalization using the channel estimate and the data subcarrier; and
decoding the channel-equalized in formation.

10. The method of claim 6, further comprising:
stopping demodulation of a remaining part of the frame signal except for demodulated MAP information when the frame signal has no allocated data; and
stopping storing the remaining part in the front memory.

11. The method of claim 6, wherein the communication system uses an Orthogonal Frequency Division Multiplexing (OFDM) scheme.

12. A terminal, comprising:
a first memory for storing a frame signal including a pilot subcarrier and a data subcarrier;
means for extracting Mobile Allocation Part (MAP) information from the first memory and determining whether the frame signal has data allocated to the terminal by using the MAP information; and,
means for performing demodulation using the pilot subcarrier and the data subcarrier when the frame signal has the allocated data,
wherein the MAP information extracted from the first memory is previously demodulated before the demodulation using the pilot subcarrier and the data subcarrier is performed.

13. The terminal of claim 12, further comprising a second memory for storing the pilot subcarrier, and a third memory separated from the second memory and for storing the data subcarrier.

14. The terminal of claim 13, further comprising means for outputting a channel estimate by estimating a channel from the pilot subcarrier of the second memory, and means for equalizing the data subcarrier from the third memory by using the channel estimates.

* * * * *